United States Patent [19]

Kamikawa et al.

[11] Patent Number: 5,329,607
[45] Date of Patent: Jul. 12, 1994

[54] PURE-SILICA CORE DUAL-MODE OPTICAL FIBER

[75] Inventors: Neil T. Kamikawa, Kaneohe; Arthur T. Nakagawa, Kailua, both of Hi.

[73] Assignee: The United States of America as represented by the Secretary of the Navy, Washington, D.C.

[21] Appl. No.: 988,607

[22] Filed: Feb. 28, 1992

[51] Int. Cl.[5] .............................. G02B 6/10
[52] U.S. Cl. .................... 385/123; 385/144
[58] Field of Search ............ 385/123, 124, 125, 126, 385/127, 128, 141, 142, 143, 144, 145, 146

[56] References Cited

U.S. PATENT DOCUMENTS

| | | | |
|---|---|---|---|
| 3,778,132 | 12/1973 | Pinnow et al. | 385/123 |
| 3,806,224 | 4/1974 | MacChesney et al. | 385/124 |
| 4,204,745 | 5/1980 | Sakai et al. | 385/124 |
| 4,447,125 | 5/1984 | Lazay et al. | 385/123 |
| 4,560,247 | 12/1993 | Aldebert | 385/124 |
| 4,734,117 | 3/1988 | Pilon et al. | 65/3.12 |
| 4,915,468 | 4/1990 | Kim et al. | 385/28 |
| 4,967,980 | 11/1990 | Pinson | 244/3.12 |
| 5,032,001 | 7/1991 | Shang | 385/142 |

OTHER PUBLICATIONS

Starkey, T. C. & Suggs, J. W., "Reduced Mode-Field Diameter Single-Mode Fiber for Specialty Applications", *Proc. IW&CS*, Nov. 15-17, 1988, pp. 15-17.
Schute, W. S., Shang, H. T., "Optical Fibers for Tethered Vehicle Applications", *DoD Fiber Optics Conf.*, Mar. 20-23, 1990, pp. 187-191.
Urano, A., Ishiguro, Y., Shigematsu, M., et al, "Pure Silica Core Dispersion-Shifted Single-Mode Fibers", *13th ECOC*, Sep. 1987, pp. 175-178.
Jeunhomme, L. B., "Single-mode Fiber Optics Principles and Applications", (Marcel Dekker, 1993), p. 91.
Ohashi, M., Kitayama, K., Kobayashi, T., Ishida, Y., "$LP_{11}$ Mode Loss Measurements in the Two-Mode Propagation Region of Optical Fibers", *Opt. Lett.*, 1984, 9, pp. 303-305.

Primary Examiner—Rodney B. Bovernick
Assistant Examiner—John Ngo
Attorney, Agent, or Firm—Harvey Fendelman; Thomas Glenn Keough

[57] ABSTRACT

An improved dual-mode optical fiber provides for an improved combination of spectral attenuation, bending losses and modal noise and modal dispersion for long-haul transmission at 1550 nm. The dual-mode optical fiber has a pure-silica core and a silica cladding depressed with fluorine so that the core and cladding have a relative refractive index difference, $\Delta$, of about 0.72% and a second-mode cutoff wavelength, $\lambda_c$, at 1630 nm. Optionally, a non-silica core and cladding can be used for long-haul transmission at 1550 nm. when the core and cladding have a relative refractive index difference, $\Delta$, of about 0.72% and a second-mode cutoff wavelength, $\lambda_c$, at 1630 nm.

2 Claims, 2 Drawing Sheets

PURE-SILICA CORE DUAL-MODE OPTICAL FIBER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The transmission of signals through optical fibers over long distances has been made possible largely because the losses in modern glass fibers are small. The lower losses in an optical fiber as compared to a metallic cable reduce the numbers of repeaters required in a transmission length, which improves the reliability and reduces the complexity of the link. Low-loss optical fibers with high bandwidths are revolutionizing long-haul communications for both commercial and military applications.

Losses in optical fibers are determined by spectral-attenuation, which is intrinsic to the fiber design, and bending losses which result from externally applied stresses. Spectral attenuation is determined by absorption and scattering, which have been minimized over the years through improvements in the glass composition and manufacturing processes. Bending losses are the result of optical power leaking out of the optical fiber where sharp bends occur in the fiber. A consequence of these bending losses is a reduction of the allowed transmission's distance.

To prevent severe bends, optical fibers have been inserted into cables with increased reinforcement and stiffness. However, a limitation of these reinforced cables is that their design dilutes the flexibility and lightweight advantages inherent in optical fibers when compared to the metallic cables. Structural modifications of the fiber itself have been attempted in an attempt to minimize bending loss, yet, for the most part, these attempts have resulted in an undesirable increase in spectral attenuation.

Thus, a continuing need exists in the state of the art for a pure-silica-core dual-mode fiber which exhibits both low bending losses and low spectral attenuation to produce a unique capability for long-haul fiber optic transmission in severe bending environments such as those encountered in undersea cables and missile tethers.

SUMMARY OF THE INVENTION

The present invention is directed to providing a long-haul transmission pure-silica-core dual-mode optical fiber to provide for a combination of improved spectral attenuation, improved bending losses and improved modal noise and improved modal dispersion for long-haul transmission at 1550 nm. A pure-silica core and a silica cladding are depressed with fluorine so that the core and cladding having relative refractive index difference, $\Delta$, of about 0.73% and a second-mode cutoff wavelength, $\lambda_c$, at 1630 nm.

An object of the invention is to provide a long haul optical fiber that exhibits both lower spectral attenuation and lower bending losses than currently available optical fibers.

Another object is to provide an optical fiber permitting longer transmission distances in applications where the optical fiber is severely bent or when wound onto small-diameter bobbins for payout.

Yet another object is to provide an optical fiber achieving both lower spectral attenuation and lower bending losses by combining a dual-mode propagation in which the cutoff wavelength is greater than the operating, or transmission, wavelength technique and an appropriately selected core and cladding design in a single fiber.

Yet another object is to provide an optical fiber incorporating a dual-mode technique that reduces the losses suffered by the fiber in a sharp bend and which incorporates an appropriately selected core and cladding design to reduce the spectral attenuation.

Yet another object is to provide a pure-silica-core, dual-mode optical fiber achieving both lower spectral attenuation and lower bending losses.

Yet another object is to provide a pure-silica-core, dual-mode optical fiber that reduces the losses suffered by the fiber in a sharp bend reduces the spectral attenuation.

These and other objects of the invention will become more readily apparent from the ensuing specification and claims when taken in consideration with the appended drawings.

DESCRIPTION OF THE PREFERRED EMBODIMENT

Referring now to FIG, 1, optical power in a typical optical fiber is shown to be confined to the center of a fiber in the radial dimension as it flows along the axis of the fiber, A magnitude of the electrical fields in the radial dimension r exhibit a Gaussian distribution as shown, A higher refractive index of the core (designated $n_1$) relative to the annular cladding ($n_2$) confines the optical power to the core. The fiber specification $\Delta$ that describes the relative core-to-clad refractive-index difference is $$\Delta = \frac{n_1 - n_2}{n_2}$$

Figure 1:
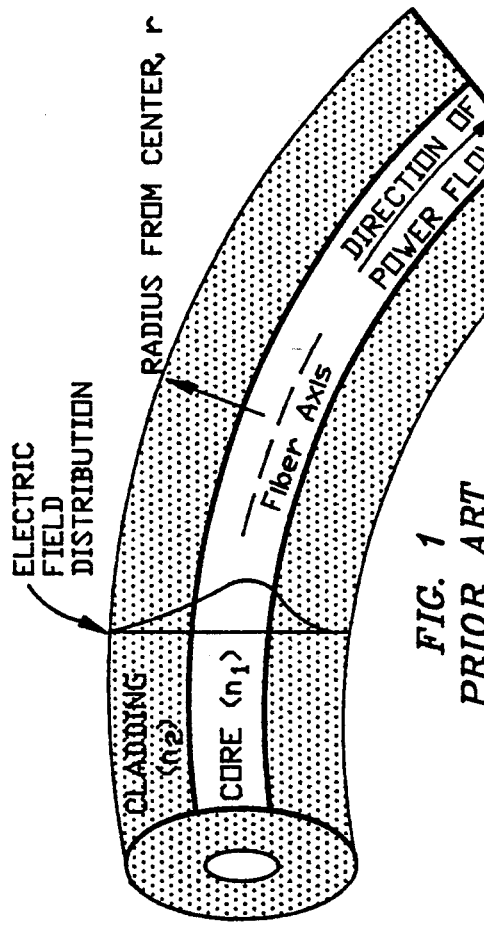
FIG. 1 is a schematic representation of power flow and electric-field distribution in a typical optical fiber.
Figure 2:
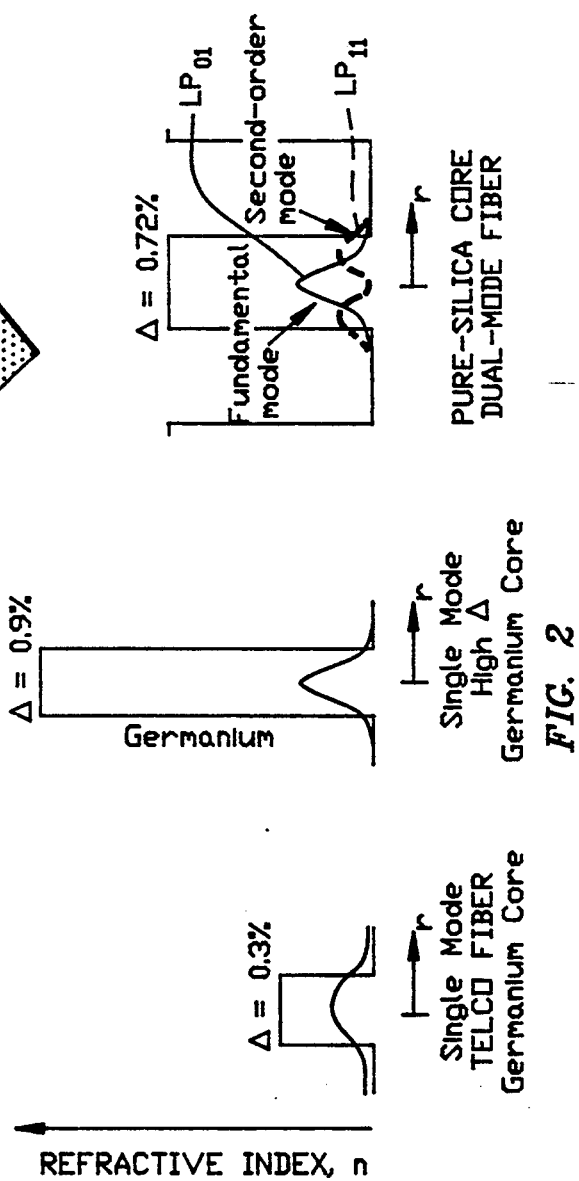
FIG. 2 depicts refractive index as a function of radial distance r from the fiber center, FIG. 3 graphically portrays bending losses at a wavelength of 1550 nm for three optical fibers.

Usually the addition of germanium to the core have been used to increase $n_1$ and $\Delta$. The $\Delta$ in the widely used commercial telco fiber developed for the telephone and telecommunication industries is 0.3%, as shown in FIG. 2. For applications where the fiber is bent severely, the $\Delta$ has been increased to 0.9% to create a high $\Delta$ fiber to confine the fields more tightly to the core, see T. C. Starkey and J. W. Suggs', "Reduced Mode-Field Diameter Single-Mode Fiber for Specialty Applications," Proc. of the International Wire & Cable Symposium (Nov. 1988), pp. 15–17. This is illustrated as the high $\Delta$ fiber in FIG. 2. The bending losses are reduced when the fields are more tightly confined and the spread of the electric-field distribution is reduced. However, higher levels of germanium must be introduced into the core to produce the higher $\Delta$, which increases Rayleigh-scattering induced spectral attenuation. Therefore, the requirements for low bending losses and low spectral attenuation conflict.

Rayleigh scattering attenuation in silica glass fibers can be minimized by depressing the refractive index of the cladding with fluorine instead of increasing the core index with germanium. Rayleigh scattering is reduced to a minimum in silica when no dopants such as germanium is added. This fiber is known as a single mode pure-silica-core fiber. Unfortunately, the largest $\Delta$ that has been achieved to date with this technique is only 0.73%, see A. Urano, Y. Ishiguro, M. Shigematsu, H. Kanamori, H. Yokota, S. Tanaka, M. Kyoto, and G. Tanaka's, "Pure Silica Core Dispersion-Shifted Single-Mode Fibers," Proc. of the 13th European Conference on Optical Communications (Sep.1987), pp. 175-178), so that the bending losses in the single mode pure-silica-core fiber will be higher than the high $\Delta$ fiber, where the $\Delta$ is 0.9%.

The bending losses in the single mode pure-silica-core fiber can be reduced to match the high $\Delta$ fiber by increasing the radius of the core to produce a pure-silica-core, dual mode fiber as shown in FIG.2. Increasing the core radius reduces the spread of the electric fields and reduces bending losses in the same way as the high $\Delta$ fiber, where the $\Delta$ is 0.9%. The advantage of creating a pure-silica-core, dual mode fiber is that the problems associated with large $\Delta$'s in single mode germanium fibers can be avoided.

The second-mode cutoff wavelength, $\lambda_c$, is normally specified instead of the core radius since $\lambda_c$ is more easily measured and it is directly proportional to the core radius. The $\lambda_c$ is $$\frac{2\pi a \sqrt{n_1^2 - n_2^2}}{2.405},$$

where a is a core radius. Therefore, increasing $\lambda_c$ in the pure-silica-core fiber reduces its bending losses.

However, modal dispersion and modal noise consideration also must be accounted for in an acceptable design. The upper limit for $\lambda_c$ is determined by signal distortions known as modal dispersion and modal noise. When $\lambda_c$ is greater than the transmission signal wavelength for dual-mode propagation in accordance with this invention concept, a second-order spatial mode $LP_{11}$ is allowed to propagate with the fundamental mode $LP_{01}$. These modes are illustrated in the pure-silica-core, dual mode fiber in FIG. 2. Since the velocities of the two modes are different, their arrival times at the end of a long fiber will be different. This causes modal dispersion. These two modes also can interfere coherently in a connector or splice to produce modal noise. Both modal noise and modal dispersion are minimized by keeping $\lambda_c$ as low as possible.

Since low bending losses require a high $\lambda_c$ and minimum modal dispersion and noise require $\lambda_c$ to be low, an optimum $\lambda_c$ must be determined.

To derive the $\Delta$ and $\lambda_c$ specifications for the pure-silica core, dual-mode fiber, the bending losses must be as low as or lower than the high-$\Delta$ fiber since the high-$\Delta$ fiber represents the lowest bending-loss fibers, see Starkey, T. C., and J. W. Suggs', "Reduced Mode-field Diameter Single-mode Fiber for Specialty Applications", Proc. IW&CS, Nov. 15-17, 1988, pp. 15-17 and Schute, W. S. and H. T. Shang's, "Optical Fibers for Tethered Vehicle Applications", DoD Fiber Optics Conf., Mar. 20-23, 1990, pp. 187-191. Also, the $\Delta$ in the pure-silica core, dual-mode fiber must be less than 0.73%, since this represents the largest $\Delta$ that has been fabricated to date in a pure-silica core, see Urano, A. and M. Shigematsu et al.'s, "Pure Silica Core Dispersion Shifted Single-mode Fibers", 13th ECOC, Sep. 1987, pp. 175-178.

The bending losses in these fibers can be expressed in terms of bending radius R as expressed in, L. B. Jeunhomme's, "Single-mode Fiber Optics Principles and Applications", (Marcel Dekker, 1983), p. 91, and given as $$\frac{A}{\sqrt{R}} e^{-UR}, \tag{1}$$

where $U = \left(\frac{0.705}{\lambda}\right)(n_2\Delta)^{3/2}\left[2.748 - 0.966\left(\frac{\lambda_c}{\lambda}\right)\right]^3$ and $A = \left[\frac{30(n_2\Delta)^{1/4}}{\sqrt{\lambda}}\right]\left(\frac{\lambda}{\lambda_c}\right)^{3/2}$ According to equation (1), $\lambda_c$ must be 1630 nm for the bending losses in the pure-silica core, dual-mode fiber with $\Delta = 0.72\%$ to be equal to the bending losses in a high-$\Delta$ fiber. The specifications are summarized n Table 1. The specifications used in equation (1) for the high-$\Delta$ fiber are $\Delta = 0.93\%$, $n_2 = 1.4585$, and $R = 1.5$ mm, where $n_2$ is the refractive index of the cladding and R is bending radius of the fiber.

TABLE 1

| Fiber | $\lambda_c$ nm | $\Delta$ % |
|---|---|---|
| Dual mode | 1630 | 0.72 |
| High-$\Delta$ | 1259 | 0.93 |
| Telco | 1154 | 0.36 |

To validate the derived specifications for the pure-silica core, dual-mode fiber, a germanium-doped core fiber was fabricated using the derived specifications for the pure-silica core dual-mode fiber. The germanium-doped, dual-mode fiber should exhibit the same bending-loss, modal noise and modal dispersion properties as the pure-silica core dual-mode fiber, but the pure-silica core fiber has the added advantage of lower spectral attenuation. The following are the results of the germanium-doped, dual-mode fiber compared with the high-$\Delta$ and commercial telecommunication (telco) fibers. The $\Delta$ and $\lambda_c$ specifications of the germanium-doped, dual-mode fiber can be transferred to the pure-silica core, dual-mod fiber with the same performance results.

Figure 3:
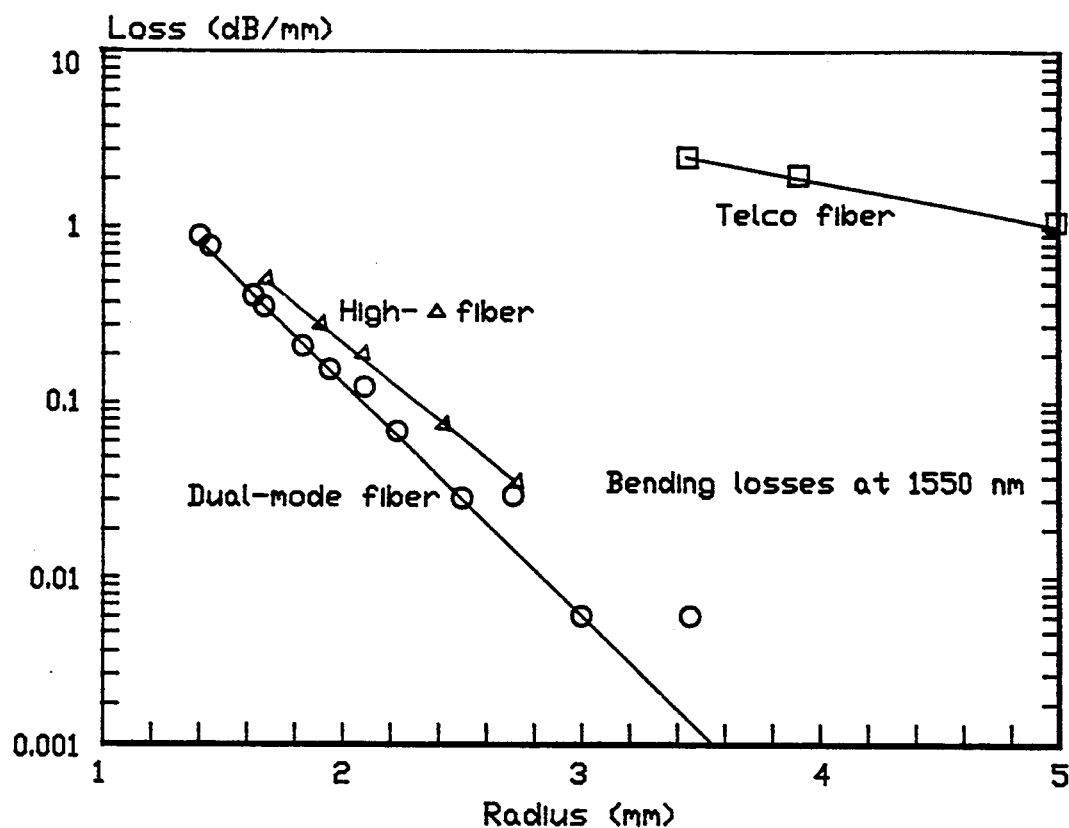
Figure 4:
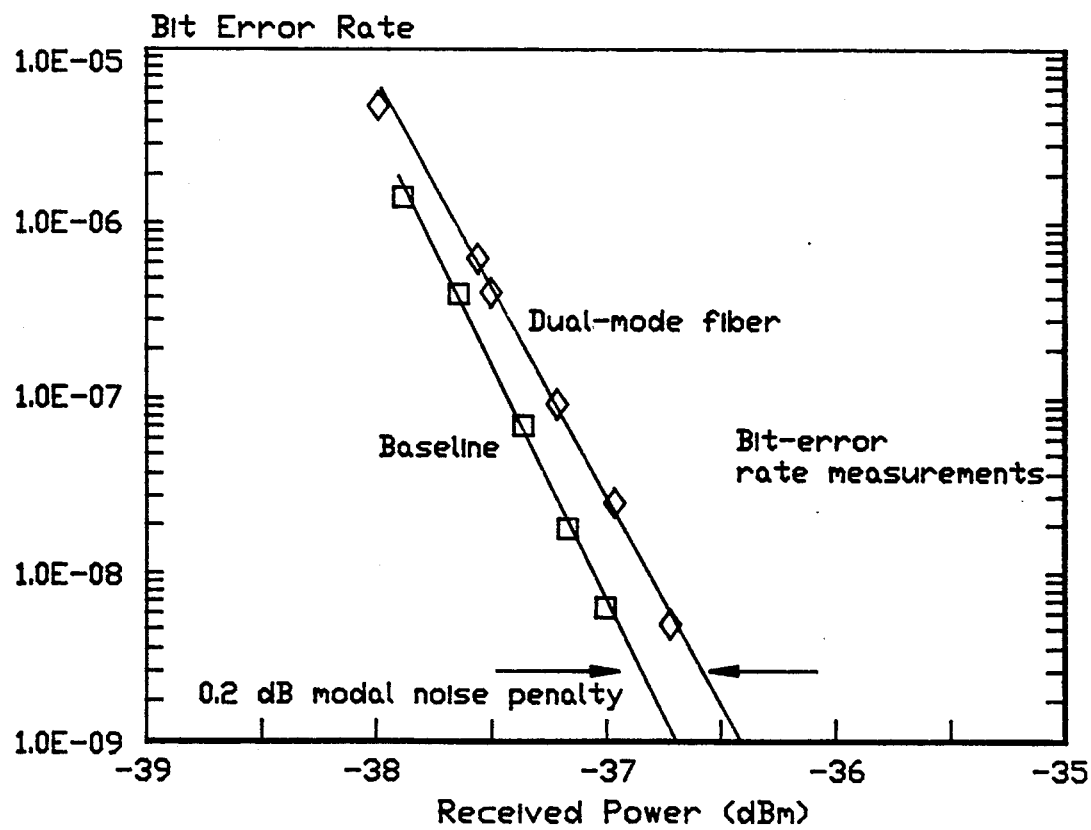
FIG. 4 is a graphical representation of bit-error rate measurements.

As shown in FIG. 3, the dual-mode fiber exhibits bending losses comparable to the single mode high-$\Delta$ fiber at 1550 nm as expected. The bending losses in both fibers also are much less than the telco fiber. To measure the bending loss in the dual-mode fiber a single-mode fiber was used as a precursor between the light source and the dual-mode fiber to insure power was launched only into the fundamental $LP_{01}$ mode.

Since the dual-mode fiber supports both the $LP_{01}$ and second-order $LP_{11}$ modes, modal noise and dispersion can impact system performance. Bit-error rates were measured to evaluate the effects of modal noise. The test was run on a 2.1-km length of the dual-mode fiber at a data rate of 200 MB/sec and a pseudorandom sequence length of $2^{20}$-1. misaligned splice with a loss of 1.5 dB was inserted 2 meters from the end of the fiber to generate the $LP_{11}$ mode and create a worst-case situation for modal noise. However, the modal noise power penalty was only about 0.2 dB, as shown in FIG. 2, with respect to a baseline measurement made by removing the dual-mode fiber and connecting the laser transmitter pigtail directly to the PINFET receiver pigtail.

Modal dispersion was assessed indirectly by measuring the spectral attenuation of the two modes separately. A differential modal attenuation measurement technique such as that proposed in M. Ohashi, et al's., "$LP_{11}$ Mode Loss Measurements in the Two-Mode-Propagation Region of Optical Fibers", Optics Letters (Jul. 1984), pp. 303-305) was used to perform this measurement. The $LP_{11}$ mode exhibited about 300 dB/km attenuation at 1550 nm, which is three orders of magnitude greater than the attenuation of the $LP_{01}$ mode and precludes modal dispersion.

Obviously, numerous modifications and variations of the present invention are possible in light of the above teachings. It is therefore to be understood that within the scope of the appended claims the invention may be practiced otherwise than as specifically described herein.

I claim:

1. An improved dual-mode optical fiber in which dual-mode propagation having a cutoff wavelength greater than an operating wavelength of both the fundamental $LP_{01}$ and second-order $LP_{11}$ modes to provide an improved combination of spectral attenuation, bending losses and modal noise and modal dispersion for long-haul transmission at said operating wavelength of about 1550 nm comprising:
   a pure-silica core to provide for reduced Rayleigh scattering and
   a silica cladding depressed with fluorine, said core and cladding having a relative refractive index difference, $\Delta$, of about 0.72% and a second-mode cutoff wavelength, $\lambda_c$, at about 1630 nm to thereby provide said dual-mode propagation with said cutoff wavelength being greater than said operating wavelength of both the fundamental $LP_{01}$ and second-order $LP_{11}$ modes.

2. An improved dual-mode optical fiber in which dual-mode propagation having a cutoff wavelength greater than an operating wavelength of both the fundamental $LP_{01}$ and second-order $LP_{11}$ modes to provide an improved combination of spectral attenuation, bending losses and modal noise and modal dispersion for long-haul transmission at about 1550 nm comprising:
   a non-silica core and
   a cladding, said core and cladding having a relative refractive index difference, $\Delta$, of about 0.72% and a second-mode cutoff wavelength, $\lambda_c$, at about 1630 nm to thereby provide said dual-mode propagation with said cutoff wavelength being greater than an operating wavelength of both the fundamental $LP_{01}$ and second-order $LP_{11}$ modes.

* * * * *